(12) United States Patent
Mehta et al.

(10) Patent No.: US 10,163,113 B2
(45) Date of Patent: Dec. 25, 2018

(54) METHODS AND APPARATUS FOR GENERATING USER PROFILE BASED ON PERIODIC LOCATION FIXES

(75) Inventors: Chand Mehta, Santa Clara, CA (US); Robert C. Lewis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1446 days.

(21) Appl. No.: 12/470,476

(22) Filed: May 21, 2009

(65) Prior Publication Data

US 2010/0004997 A1 Jan. 7, 2010

Related U.S. Application Data

(60) Provisional application No. 61/056,407, filed on May 27, 2008.

(51) Int. Cl.
*G06Q 30/02* (2012.01)
*H04W 4/02* (2018.01)
(Continued)

(52) U.S. Cl.
CPC ......... *G06Q 30/02* (2013.01); *G06Q 30/0269* (2013.01); *H04L 67/18* (2013.01);
(Continued)

(58) Field of Classification Search
CPC .................................................. G06Q 30/02
(Continued)

(56) References Cited

U.S. PATENT DOCUMENTS 6,975,941 B1 * 12/2005 Lau et al. ............... 701/213
7,167,715 B2    1/2007 Stanforth
(Continued)

FOREIGN PATENT DOCUMENTS

CA   2500082      9/2006
EP   1912462 A1  4/2008
(Continued)

OTHER PUBLICATIONS

US Dept. of Labor, Bureau of Labor Statistics, American time USE Survey 2005, USDL 06-1276, p. 2.*
(Continued)

*Primary Examiner* — Daniel M Sorkowitz
(74) *Attorney, Agent, or Firm* — Muncy, Geissler, Olds & Lowe, P.C.

(57) ABSTRACT

Implementations relate to systems and methods for generating a user profile based on periodic location fixes. A cellular telephone or other mobile device captures location information via GPS or other capability. A location history can be generated from accumulated location fixes. The location history is then analyzed to detect the user's travel and dwell patterns. That information can be combined with business classification (e.g., SIC, etc.) or Point of Interest (POI) databases to identify a user's likely home, work, or other locations based on dwell-times, time of day, and other parameters. The user's age and gender can potentially be inferred based on types of locations visited, such as school locations. The user profile can be correlated with market segmentation databases to generate a marketing rating, such as a Nielsen or Claritas rating. Advertising, media, or other content can then be tailored to the user's individual location and demographic profiles.

58 Claims, 10 Drawing Sheets

(51) Int. Cl.
    H04L 29/08    (2006.01)
    H04W 4/029   (2018.01)
    H04W 8/18     (2009.01)
(52) U.S. Cl.
    CPC ............ *H04L 67/306* (2013.01); *H04W 4/02*
        (2013.01); *H04W 4/029* (2018.02); *H04W 8/18*
        (2013.01)
(58) Field of Classification Search
    USPC ...................................................... 705/14.66
    See application file for complete search history.

(56) References Cited

U.S. PATENT DOCUMENTS

| | | | |
|---|---|---|---|
| 7,940,908 | B2 | 5/2011 | Sprigg et al. |
| 2001/0036224 | A1 | 11/2001 | Demello et al. |
| 2002/0111172 | A1* | 8/2002 | DeWolf et al. ............... 455/456 |
| 2002/0120516 | A1 | 8/2002 | Sakagami et al. |
| 2005/0003835 | A1 | 1/2005 | Riise et al. |
| 2007/0061197 | A1* | 3/2007 | Ramer et al. ................... 705/14 |
| 2008/0076450 | A1 | 3/2008 | Nanda et al. |
| 2008/0125959 | A1* | 5/2008 | Doherty et al. ............. 701/200 |
| 2010/0076968 | A1 | 3/2010 | Boyns et al. |

FOREIGN PATENT DOCUMENTS

| | | |
|---|---|---|
| JP | 2002324079 A | 11/2002 |
| JP | 2005222111 A | 8/2005 |
| JP | 2006527888 A | 12/2006 |
| KR | 20030000530 A | 1/2003 |
| KR | 20040106346 | 12/2004 |
| KR | 20060082737 A | 7/2006 |

OTHER PUBLICATIONS

Chansophea Chuon Sumanta Guha A K M Mahtab Hossain: "Individual Profile Graphs for Location Management in PCS Networks" Wireless Networks, Communications and Mobile Computing, 2005 Internati Onal Conference on Maui, HI, USA Jun. 13-16, 2005, Piscataway, NJ, USA,IEEE, vol. 1, Jun. 13, 2005 (Jun. 13, 2005), pp. 187-192, XP010887957 ISBN: 978-0-7803-9305-9.
International Search Report and Written Opinion—PCT/US2009/044985,International Search Authority-European Patent Office—dated Jun. 24, 2010.

* cited by examiner

| Observation | lat/lon | Favorite Location | Dwell Time (sorted by) | Number of visits | Avg dwell time per visit |
|---|---|---|---|---|---|
| 1 | x1,y1 | Fav 1 | 50 hr | 15 | 3.6 hr |
| 2 | x2,y2 | Fav 2 | 40 hr | 10 | 4 hr |
| 3 | x3,y3 | Fav 3 | 2 hr | 5 | 24 min |
| 4 | x4,y4 | Fav 4 | 1 hr | 2 | 30 min |
| 5 | x5,y5 | Fav 5 | 30 min | 1 | 30 min |
| 6 | x6,y6 | Fav 6 | 30 min | 1 | 30 min |
| 7 | x7,y7 | Fav 7 | 20 min | 1 | 20 min |
| 8 | x8,y8 | Fav 8 | 15 min | 1 | 15 min |
| 9 | x9,y9 | Fav 9 | 15 min | 1 | 15 min |
| 10 | x10,y10 | Fav 10 | 10 min | 1 | 10 min |

FIG. 2A

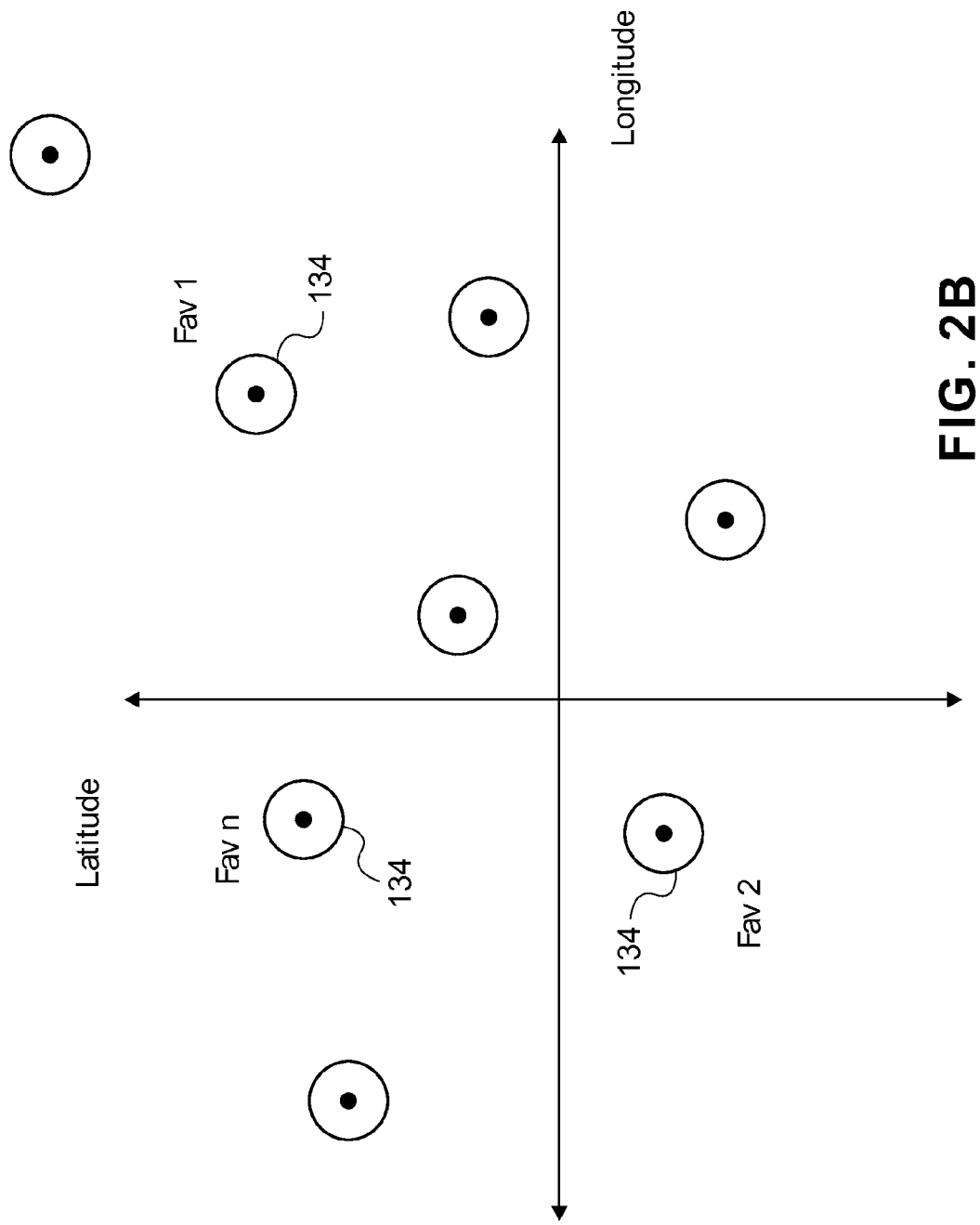

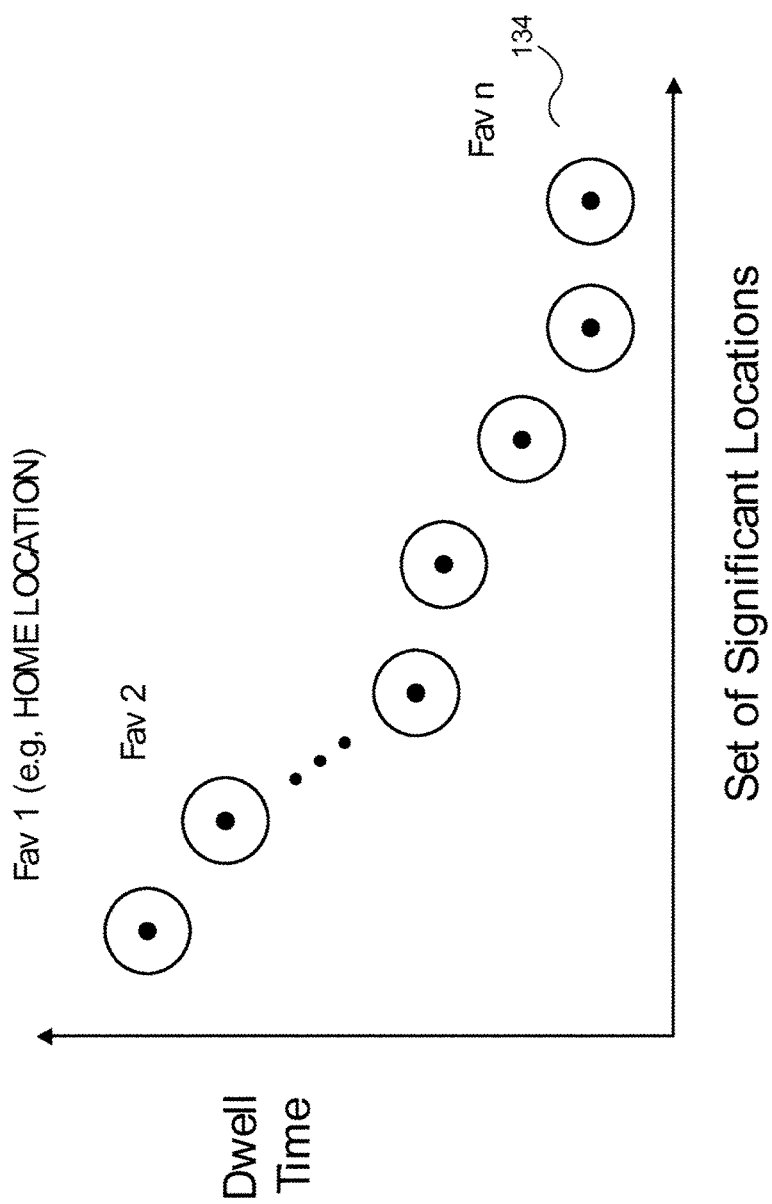

METHODS AND APPARATUS FOR GENERATING USER PROFILE BASED ON PERIODIC LOCATION FIXES

CROSS-REFERENCE TO RELATED APPLICATIONS

The present application relates to U.S. Provisional Application No. 61/056,407 filed May 27, 2008, entitled "Method and Apparatus for Generating User Profile Based on Periodic Location Fixes," assigned or under obligation of assignment to the same entity as this application, from which provisional application priority is claimed, and which provisional application is incorporated by reference herein.

BACKGROUND

The present teachings relate generally to method and apparatus for generating user profiles based on periodic location fixes, and more particularly to platforms and techniques for automatically generating user demographic or marketing profiles based on user location history tracked via a mobile telephone or other location-aware device.

Advertising content and other media can be targeted, delivered, and priced as a function of the demographic profile of the intended recipients. For example, broadcast television media can contain advertising content that is tailored to the collective demographic profile of a given geographic region, such as a county or metropolitan area. The aggregate demographic profile of a certain city can, for instance, consist of an average age of 40 to 50 years, possibly with a most-likely gender or average household size, and within certain income bands. Advertisers or other content providers can therefore direct products and services of interest to the target population more effectively, and media such as broadcast or cable television stations can price and schedule advertising slots more appropriately for a defined demographic region. However, even when effectively employed, metro-scale marketing studies must often be generated through manual efforts, such as surveys, census reports, or other kinds of information gathering which do not lend themselves to automatic data collection or timely updating.

According to other content delivery platforms in the Internet space, a user's history of visited Web sites, purchase, or content selection choices can be tracked to generate a predicted profile of sites or content of interest to that single user. The delivery of media based on profiles developed on aggregate geographic scales or Web usage involves, however, a number of drawbacks. Demographic profiling at the relatively coarse level of county or metropolitan populations, for instance, necessarily overlooks potential sub-populations within those relatively large geographic areas that could represent potentially valuable target communities. Certain marketing platforms such as Claritas Prizm™ NE can provide household-level segmentation, but even this segmentation code is then assumed for every person in the household irrespective of their age group or financial responsibilities. The potential for building targeted marketing campaigns or other media directed at a more granular level is therefore not realized.

Web usage patterns in their own turn can provide a predictor of future Web behavior for individual users and possibly, groups of users, but may not predict behavior outside that environment, including mobility and consumption patterns around a user's home location. Consumers may not receive the benefit of customized product and service offerings that identifies small or concentrated communities, households, or individuals within households, due to the lack of resolution in consumer profiling platforms, as they exist today.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to the present teachings in one or more aspects, methods and apparatus for generating a user profile based on periodic location fixes are provided, in which a user's geographic location is periodically sampled at defined intervals to build a location history. In one or more implementations of the present teachings, the location history can be stored and analyzed to determine the site of visited locations and likely demographic details about the user derived from their location patterns, including the user's likely home and business addresses.

According to one or more implementations, a user's location data can be received from or captured by a mobile device such as a cellular telephone, Global Positioning System (GPS) unit, network-enabled personal digital assistant, or other location-aware mobile device. In one or more implementations, the mobile device can report or generate the user's location within a certain amount of accuracy, such as for instance 30 meters or less in the case of GPS-equipped devices, which permit the user's behavior to be profiled with comparatively greater accuracy than other known platforms. Other location services can also be used to identify and track user location. The mobile device can take a location fix using that capability at defined intervals, such as every 1 minute, 5 minutes, half hour, or other interval. The user's location history can be accumulated on the device itself, and/or reported to a wireless server that builds a record of the location history. After a sufficient location history is recorded, an analysis can be performed on the user's accumulated location history including to identify repeatedly visited locations, changes in location, dwell times at different locations, time of day, day of week, or other date information associated with specified locations to arrive at a likely profile for the user.

That user profile can include predicted information such as the likely home address of the user, derived from the location at which the user spends the greatest amount of time, or greatest amount of time at certain times of the day or week. The identification of home, work, and other locations can be filtered or refined using business classification or geographic databases, such as the Standard Industrial Classification (SIC) database published by the United States Federal Government. Other inferences can be drawn from the user's location history, including the likely location of the user's workplace or school, based on similar variables.

In one or more implementations, the location history of the user can be correlated with existing demographic or market segmentation databases or platforms, to derive further demographic or consumer profile information related to that user. For example, the user's location history can be used to derive a most-likely home location, which in turn, can be correlated with a market segmentation platform. The market segmentation platform can report demographic information such as income brackets for individuals within stored zip codes or other areas associated with the predicted home location. The heuristic engine of the market segmentation platform can consequently be used to arrive at a likely income range for that individual based on their estimated home location. For another example, the user's home address and other information can be fed to a platform to generate a Nielsen score generated by the Nielsen Media Research rating for the user, based on that identified home location. Other demographic features can be determined or projected based on the location history, and comparison against other demographic, market segmentations or other databases. In one or more implementations, the user's location history can be accessed to organize and strategize the delivery of coupon, advertising, media, point of interest (POI) approaches or other services or content, and other types of targeted delivery.

According to one or more implementations, in one regard, because location history and other behavioral patterns can be captured and linked to users and their home locations with comparatively high degrees of geographic resolution and at comparatively high levels of accuracy, marketing and other media delivery can be personalized and monetized at the individual level, rather than a coarser collective or community-wide level.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures:

FIG. 2A illustrates an exemplary location history for a user including a set of location fixes, according to one or more implementations of the present teachings;

FIG. 2B illustrates a scatter plot of favorite or significant locations for a user, according to one or more implementations of the present teachings;

FIG. 2C illustrates a plot of location data sorted by dwell time, according to one or more implementations of the present teachings;

DETAILED DESCRIPTION

Figure 1:
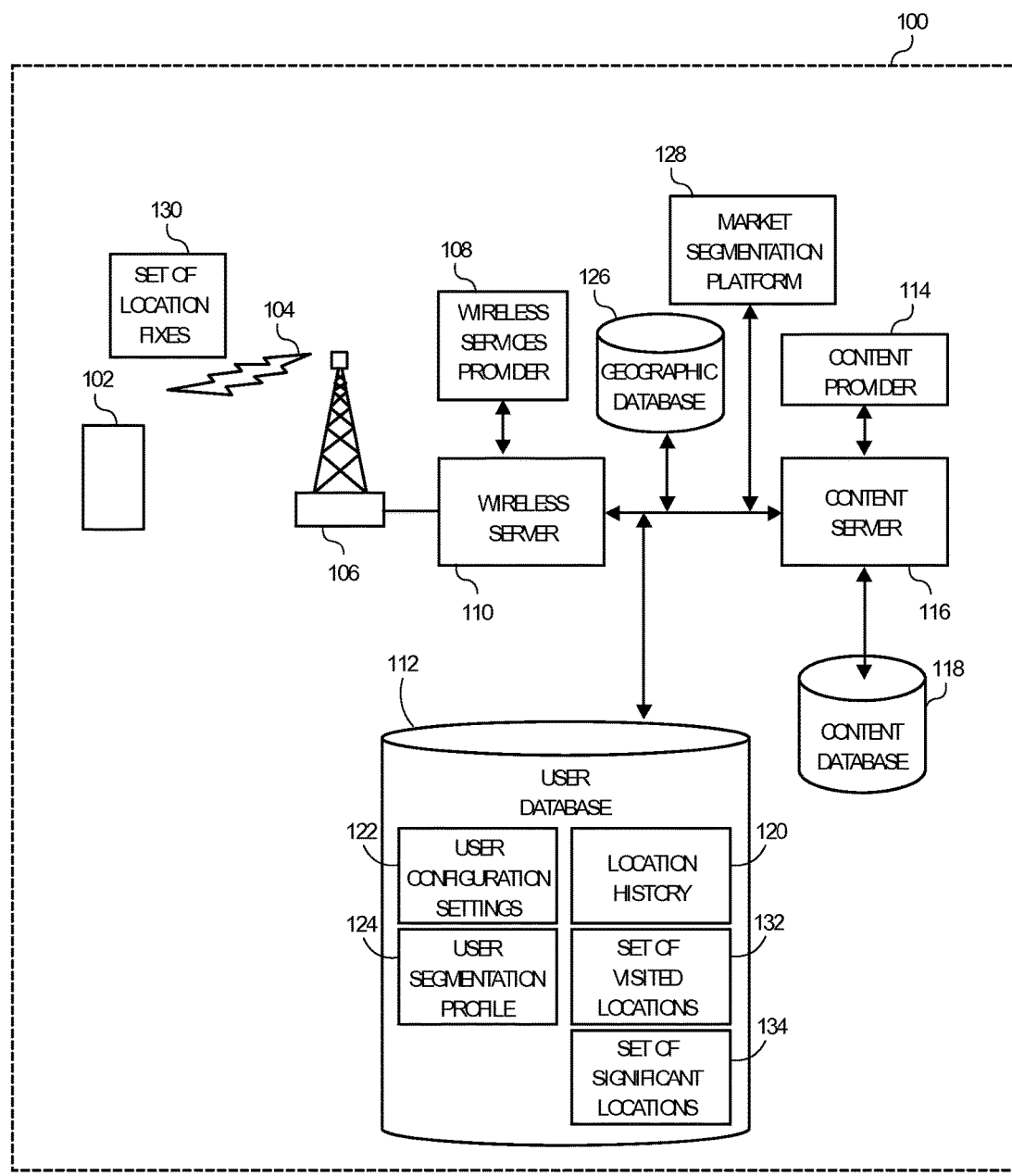
FIG. 1 illustrates an exemplary network for a mobile device, consistent with one or more aspects of the present teachings.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Additionally, various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

One or more aspects of the present teachings relate to methods and apparatus for generating a user profile based on periodic location fixes. More particularly, in one or more aspects, and as for example generally shown in FIG. 1, platforms and techniques are provided in which periodic location fixes are performed in an overall network 100 to determine the position or location of a mobile device 102. According to one or more implementations, and as for example generally shown in FIGS. 2A-2C, the captured set of location fixes 130 can be used to build a location history 120 for the user of mobile device 102. In one or more implementations, for instance as shown in FIG. 2A, the location history 120 can incorporate the set of location fixes 130 expressed in latitude/longitude readings or other form. In one or more implementations, the location history 120 can be analyzed as described herein to generate a set of significant (or favorite) locations 134, representing locations toward which the user has demonstrated some affinity or tendency to dwell or remain. In one or more implementations, location history 120 can contain additional data, which as shown, can illustratively include an observation or reading number, a set of significant (or favorite) locations 134, a recording of the dwell time at a given location, the total number of visits to a given location, and individual or average dwell times at a given location. In one or more implementations, other data can be captured or calculated.

In one or more implementations, and as shown for instance in FIG. 2B, the set of significant locations 134 can be represented in a scatter plot or other mapping indicating a proximity of those sites to each other in the user's location history 120, as well as a set of visited locations 132, which may not qualify as significant or favorite. In one or more implementations, analysis of the location history 120 and associated data can be used to derive set of visited locations 132, based on an analysis of variables such as the position, speed, and incremental change in position of mobile device 102. The user's set of visited locations 132 can in turn be analyzed to identify or derive a set of significant locations 134, such as home and/or work locations for the user. For example, locations in set of visited locations 132 which were not visited for a time of at least two minutes or some other threshold may be discarded from consideration for set of significant locations 134. Locations demonstrating significant dwell time, significant numbers, or return visits, and/or satisfying other criteria as described herein can be qualified or provisionally qualified for set of significant locations 134. In one or more implementations, once identified, the home, work, or other locations, sites, or positions in significant locations 134 can be checked or verified against geographic databases, for instance to confirm that a projected home location lies within a residential area. It may be noted that the set of significant locations 134 can be located anywhere on earth, and the origin in FIG. 2B merely represents an arbitrary point around which some or all of a user's set of significant locations 134 are clustered.

In one or more implementations, and as shown for instance in FIG. 2C, the generated set of significant locations 134 can be ordered or sorted based on the recorded dwell times of the user in each location. This graph or chart can indicate the relative significance of different locations in set of significant locations 134, relative to each other. In one or more implementations as shown, a given user's location tendencies can for instance follow a non-linear pattern, with one or two favorite locations representing a significantly greater amount of dwell time than others. Other dwell patterns are possible and may be demonstrated by different users.

In one or more implementations, when the user's home, work, or other significant locations are learned, a market segmentation platform can be accessed to establish an initial marketing or demographic profile for the user, based on knowledge of that specific geographic location or area. For instance, a user's likely age or income range can be projected. Equipped with a comparatively high-resolution profile about the user, specific marketing, media, or other content can then be generated and delivered to the user via mobile device 102, the Internet, or other channels or services. The network operator, vendors, or other providers can then capitalize on specific marketing opportunities that may be of particular interest to each user and their particular demographic and consumer profile.

More particularly, as also shown in FIG. 1, in one or more implementations, mobile device 102 can communicate with a wireless server 110 via an air interface 104 and base station 106 supported by a wireless services provider 108 operating within network 100, as shown. Mobile device 102 can be any mobile device(s) having a location-detection capability, such as a location-aware cellular telephone, a GPS unit, a network-enabled media player, or a network-enabled personal digital assistant (PDA), etc. Mobile device 102 can report location fixes, such as GPS location data, to wireless server 110. Wireless server 110 can in turn communicate with a set of resources including a user database 112 storing user-related subscription, configuration, positioning, and other information. Wireless server 110 can also communicate with a content server 116 and content database 118 operated by a content provider 114, such as a media provider, marketing provider, or other provider or source of content to be delivered to the user of mobile device 102 based on their location behavior and other data.

Wireless server 110 can collect one or more set of location fixes 130 from mobile device 102. Each set of location fixes 130 can contain one or more data points recording the location of mobile device 102, such as, for example, one or more latitude/longitude pairs generated by a GPS or other location module. The set of location fixes 130 can be stored and accumulated to generate a location history 120 reflecting the set of locations at which mobile device 102 has been located, over time. The patterns of movement and behavior reflected in location history 120 can, in general, be used to generate user marketing and/or demographic profiles, According to one or more implementations described herein.

Figure 3:
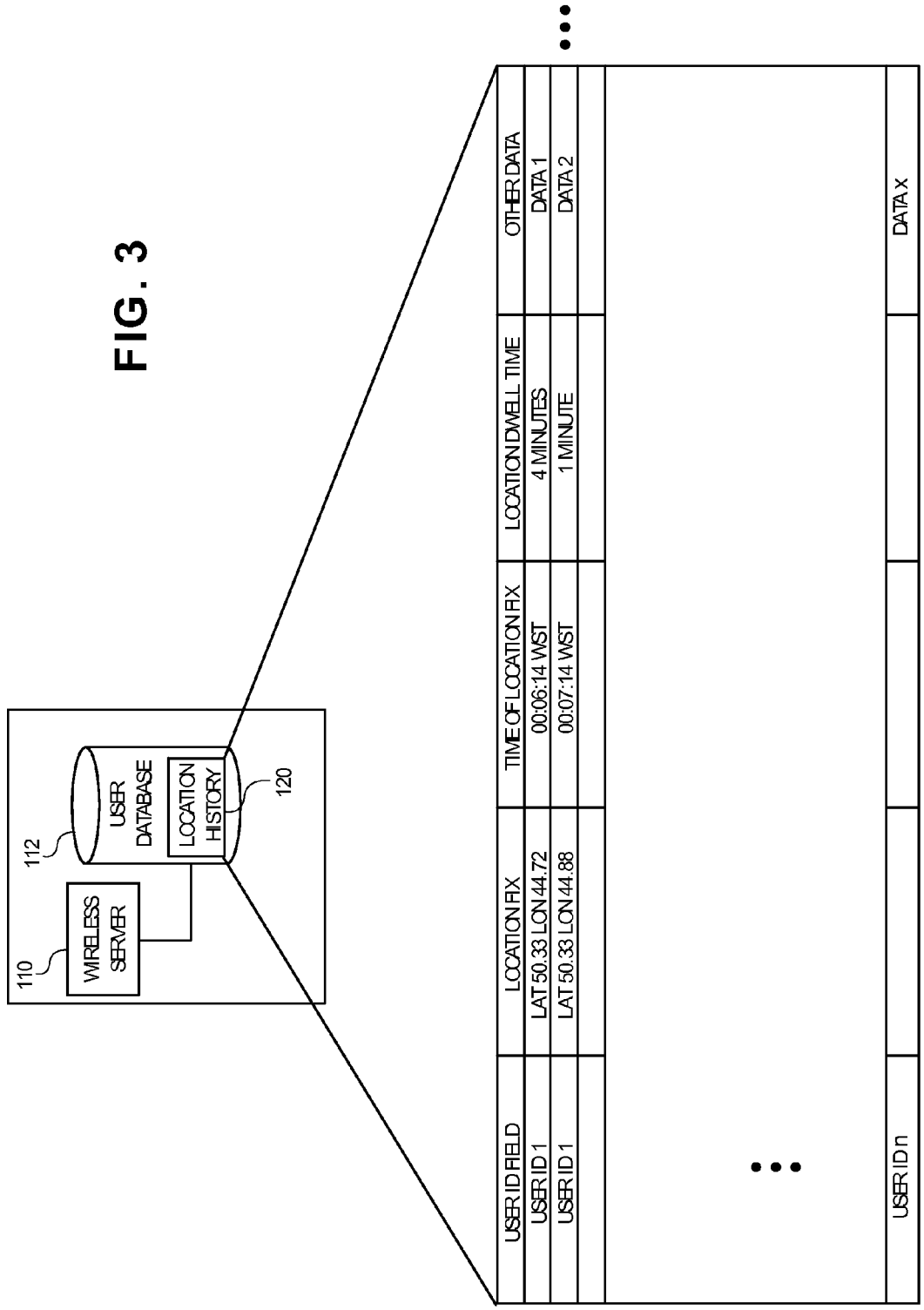
FIG. 3 illustrates an exemplary data schema recording a user's location history, according to one or more implementations of the present teachings.

FIG. 3 illustrates an illustrative data schema for location history 120 for storing the position data and other information associated with the travel and usage history of mobile device 102. As illustrated, location history 120 can record one or more data fields reflecting location fix information (e.g., latitude and longitude values, etc.), the time at which a location fix was captured, dwell-time information, or other data.

In terms of initial position processing, and using that data to capture a set of visited locations 132 for the mobile device 102 and the user of that device, a set of position or location fixes can be periodically captured using various location services and techniques. According to one or more implementations in one regard, a position or location fix can be performed on a periodic basis by the mobile device 102, for instance using a location-aware application programming interface (API). The identification of the location or position of mobile device 102 can be performed using various location services, such as GPS, base-station triangulation, Assisted GPS (A-GPS), tower triangulation based on cellular telephone base station triangulations to a registered cellular telephone, the European Galileo position system, or other positioning or location services or techniques. Each location fix can for example generate a latitude and longitude reading, or other data indicating the user's location or position. In one or more implementations, an altitude reading can also be captured. In one or more implementations, the sampling rate for the periodic fixes can be a fixed interval or period of time, such as every 30 seconds, 1 minute, 5 minutes, half hour, or other interval. In another implementation, the sampling rate for position fixes can vary, for example, as a function of the location, or the rate of change in location, of the mobile device 102. For example, the sampling rate for location fixes can be increased when mobile device 102 is moving at comparatively higher speeds. In terms of integration in mobile device 102, a location fix can be taken periodically using the BREW® API available from Qualcomm Incorporated of San Diego, Calif. Other location-aware APIs or services can be used to integrate position-based services in mobile device 102.

Figure 4:
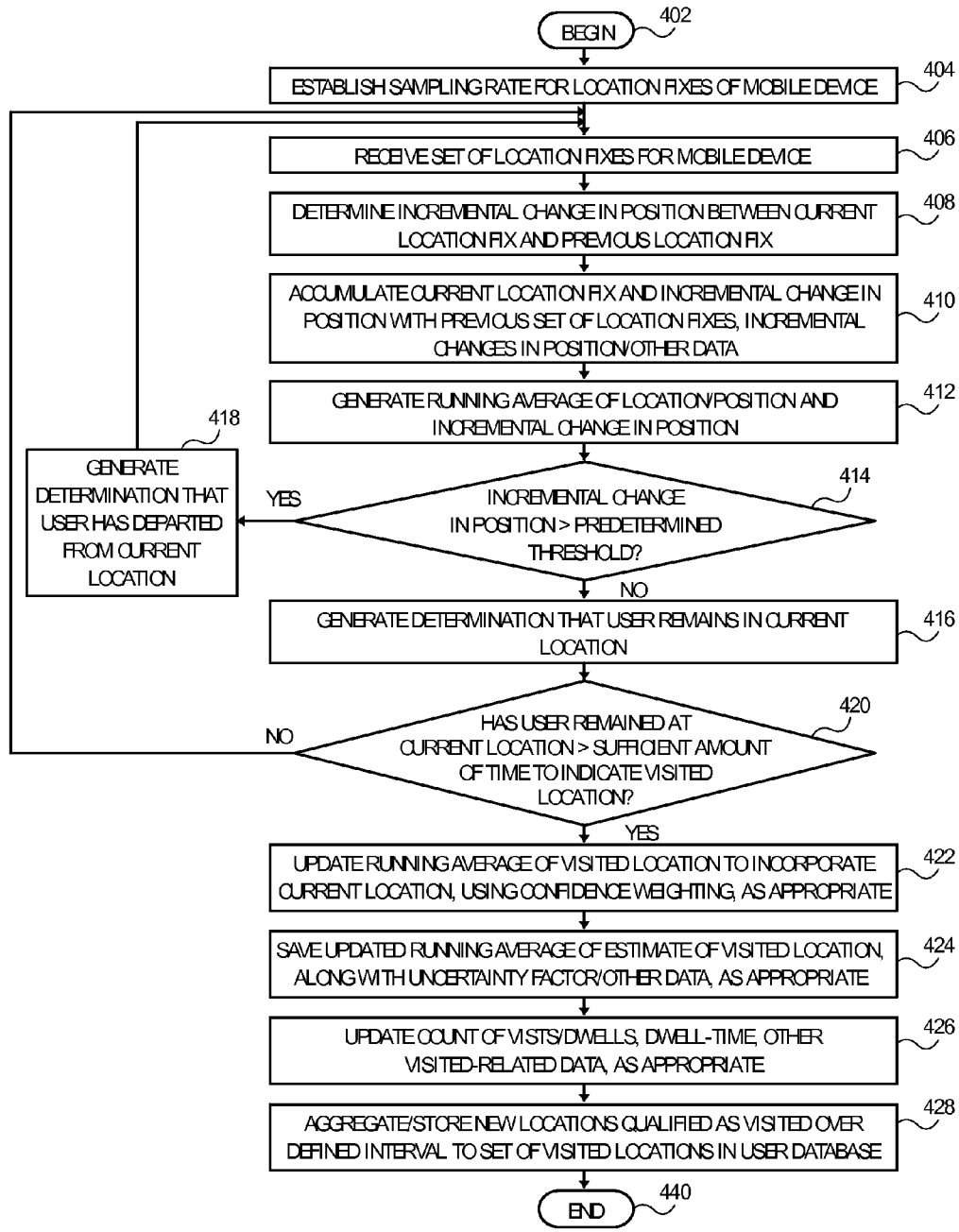
FIG. 4 illustrates a flowchart of processing to identify a set of visited locations from a set of location fixes in a user's location history, according to one or more implementations of the present teachings.

FIG. 4 illustrates processing of a set of location fixes 130 to generate a set of visited locations 132, according to one or more implementations. In 402, processing can begin. In 404, the sampling rate or sampling rate function for pinpointing the location of mobile device 102 can be established. In one or more implementations, as noted, the sampling rate for the set of location fixes 130 can be set to a predetermined initial rate, such as for instance one position fix every 30 seconds, minute, or other interval. In another implementation, the sampling rate can be configured to vary according to other parameters, such as the current speed of movement of mobile device 102, the stationary or moving status of mobile device 102, or other factors. In 406, a set of location fixes 130 can be received for mobile device 102, using a GPS chip or other device, interface, or service operating to establish the location of mobile device 102, using the established sampling rate.

In 408, as for example also in part illustrated in FIGS. 2A-2C, after a set of (at least two) location fixes 130 is taken, in one or more implementations, an incremental change in position between the current location fix and the previous location fix can be calculated. The incremental change in position can include, for example, a distance between the last position fix and current location fix. In 410, the current location fix and incremental change in position from the previous location fix can be accumulated with that information for the previous fix or fixes stored in set of location fixes 130. In 412, a running average of position and incremental change in position can be generated using the accumulated location and incremental change in position data.

In 414, a determination can be made whether the incremental change in position between the current and previous location fix is greater than a predetermined threshold above the running average of incremental change in position for that data derived from set of location fixes 130. If the incremental change in position between the current and previous location fix is greater than a predetermined threshold above the running average of incremental change in position, in 418 the mobile device 102, wireless server 110, and/or other logic can determine or assume that the user has moved out of the previous location. After a determination that the mobile device 102 and user of the device has changed location, processing can return to 406.

If on the other hand the incremental change in position determined in 414 is less than the predetermined threshold value, in 416, the mobile device 102, wireless server 110, and/or other logic can determine or assume user is still at, or within a vicinity of, the previous location. In 420, a determination can be made whether the user has spent a sufficient amount of time at the current location and/or its vicinity to indicate a valid estimate as a visited location. For example, a determination can be made whether the user has spent at least 15 minutes, a half hour, an hour, or other interval or period of time at the current location and/or its vicinity. In one or more implementations, the threshold amount of time sufficient to indicate the present location is being "visited" can vary rather than being fixed. For instance, the minimum time can vary as a function of the location, the user's location history 120, or other factors.

If the determination in 420 is that a sufficient amount of time has been spent at the current location, in 422 the mobile device 102, wireless server 110, and/or other logic can update the running average of the estimate for the current visited location to incorporate the current location estimate. In one or more implementations, the running average can incorporate a weighted average of the estimate of current location based on a confidence measure for the accuracy of the currently identified visited location, along with confidence weights for the previously identified values for the currently visited location. The confidence values, which for example can be recorded in a range of zero to 1 or other scales, can indicate the level or degree of certainty in the location value for the currently visited location. In one or more implementations, the running average need not include weights or confidence values.

In 424, the mobile device 102, wireless server 110, and/or other logic can save the updated average location estimate for the current location, as well as updated uncertainty and/or other data. In 426, a count of a number of visits or dwells, or the dwell-time, of the user in the current visited location can be updated, as appropriate. In 428, at the end of a defined interval or period, for example, one day, one week, one month, or other interval or period, all locations that have been qualified as visited by mobile device 102 can be aggregated and stored to set of visited locations 132, along with location history 120 and other information hosted in user database 112. In 430, processing can repeat, return to a prior processing point, jump to a further processing point, or end.

According to one or more implementations, a visited location can thereby be defined and identified as a single location that has been established as a visited location where user has spent an amount of time that is greater than a threshold value. Each location validated as a "visited" location can be stored to the set of visited locations 132 recording the user's history of visited sites, derived from the raw location history 120.

The set of visited locations 132 can represent a set of positions which the user of mobile device 102 has occupied for some threshold of time. It may be noted, however, that not all visited locations represent a significant location for the user, reflecting identifiable travel or consumption habits. It may be the case, for example, that a user may stop at a service station while en route on travel and spend a half hour or more to refuel their vehicle, but this does not necessarily reveal a significant trend or pattern in the user's demographic or marketing profile.

In terms of generating a set of significant locations 134 from set of visited locations 132, in one or more implementations, therefore, the mobile device 102, wireless server 110, and/or other logic can process the set of visited locations 132, location history 120, and related data to identify a set of significant locations 134, such as probable home and/or work locations, for the user. In terms of that determination, the mobile device 102, wireless server 110, and/or other logic can save the top N locations where user spent most amount of time. In one or more implementations, N can=2, 3, or other number. If the total dwell time at the top 2 or other number of locations is greater than a predetermined threshold value, the location can be flagged or marked as a candidate for a home or work location. The threshold value can, for instance, be 20 hours per week, or another value.

When the dwell time meets or exceeds the threshold, a location can be marked as candidate for home and/or work location. In one or more implementations, the process can be repeated the next day, the next week, or other window or period of time. If a different candidate location appears in the top two (2) the following period, in one or more implementations, it can be marked as suspect or indeterminate. In one or more implementations, the home/work identification process can be repeated every week or other period, to monitor for potential changes or relocations. In one or more implementations, in addition to the total dwell time being measured for the top two (2) or other locations, a time of day filter can also be applied. For example, a location having a dwell time that begins on average after 9 p.m. in the evening can be assumed to be a home location, versus a work location. Other time of day criteria or other filters can be used.

The mobile device 102, wireless server 110, and/or other logic can then determine a projected or estimated set of significant locations 134 for the user of mobile device 102, based on patterns in the location history 120 over the weekly or other period. In one or more implementations, the mobile device 102, wireless server 110, and/or other logic or network resources can generate a likely candidate for a home location for the user of mobile device 102, as one of the set of significant locations 134 for the user of mobile device 102. In one or more implementations, set of significant locations 134 can also or instead include a likely work or employment location for the user of the mobile device 102, based on location history 120.

In terms of generating an inference regarding a potentially significant location for the user, in one or more implementations, therefore, and as in part illustrated in FIGS. 2A-2C, the location having the highest or most frequent significant dwell time can be identified as the home location of the user. In one or more implementations, the location having the second-highest or second-most frequent significant dwell time can be identified as the work location of the user. In one or more implementations, a location having a highest dwell-time can be determined to be a work location, such as for instance in situations where no home location can be determined. In one or more implementations, other potential categories of locations tending to reflect longer dwell times can also be identified in set of significant locations 134. Other categories or types of locations can be identified in set of significant locations 134, such as, for instance, school locations, locations of vacation residences, locations related to recreational activities, or others.

With home, work and any other locations of interest being identified in set of significant locations 134, as also illustrated in FIG. 1, in one or more implementations, the nature of those locations can be checked against one or more external geographic database 126, or other geographic sites services. In terms of identifying a user's geographic location, platforms and techniques according to the present teachings can pinpoint a user's home location at the level of a street address, or other comparatively fine-grained unit of address, by accessing a geographic database 126. In one or more implementations, reverse geocoding in XML (extensible markup language)/HTTP (hyper text transfer protocol) code, other code or protocols, can be used. The mobile device 102, wireless server 110, and/or other logic can access a geographic database 126 and obtain a street address associated with a visited location identified in a user's series of location fixes. In terms of correlating that data with market segmentation platforms, the known Claritas Segmentation Code can, for instance, be accessed or exchanged using XML/HTTP code. The mobile device 102, wireless server 110, and/or other logic can use the street address from the previous processing steps and, for instance, determine the associated Clarita PRIZM™ NE (ZIP+6) segment code for the top 2 or other number of visited locations.

If a returned segment level for a location is ZIP+6, that location can be marked as a "prospect" home location due to the indication that that zone represents a residential area. In one or more implementations, a property or location type can also be identified using other geographic or demographic databases, such as the commercially available TeleAtlas™ database, the afore-mentioned SIC Codes, or the commercially available Connexion™ NE segmentation scheme. In one or more implementations, an estimated confidence number for the returned Segment code can be generated based on data including the type of "matchcode," a distance from "input lat/lon" (latitude/longitude) and the uncertainty associated with "input lat/lon." Other variables can be used to estimate a confidence number, which can for example range from 0 to 1 or other values.

In one or more implementations, therefore, the SIC or other geographic code for the likely home and work locations in set of significant locations 134 can be extracted from a geographic database 126, Web service, or other source, and be used to increase the confidence in a location identification. Home and work locations, when generated, can for instance be confirmed based on the SIC code for the projected location, so that, for example, a location identified as a home location can be confirmed as a home-category location as noted when that site is located within a coded residential area in SIC or other mappings. According to one or more implementations, the accuracy of the identified home, work, and/or other locations can increase as more data points are accumulated in location history 120, and the user's underlying location patterns can be more firmly or accurately established. A projected home location that matches a coded residential area and/or other criteria, such as billing records or user-reported address information, can be referred to as a confirmed home location.

In one or more implementations, and as similarly illustrated in FIG. 1, using the confirmed home location, the mobile device 102, wireless server 110, or other logic can communicate with a market segmentation platform 128 to generate a demographic, marketing, or other profile or characterization or classification of the user. The market segmentation platform 128 can, for example, associate a market segmentation code, such as a commercially available Claritas PRIZM™ NE segment code, with that user based on that identified home location. Similarly, the SIC or other geographic code extracted from geographic database 126 can be determined for all the visited locations in a user' location history 120. The market segmentation platform 128 or other logic can report various likely characteristics related to the location history 120 displayed by the user. For example, In one or more implementations, an age group can be determined that is most likely to visit a particular location type, such as a 18 through 24 year olds for a university campus, or other age ranges for other levels of school sites. In turn, a most likely age group of a user can be determined based on all the visited locations, number of dwells, total dwell time, and/or other information contained in location history 120 for different recorded locations. In one or more implementations, the user's age can be estimated by averaging the ages suggested by individually visited locations or sites. In one or more implementations, inferences about other attributes of the user, such as gender, can also be drawn based on location history, geographic database 126, market segmentation platform 128, and/or other external databases or other sources of information.

Based on the location history 120, market segmentation, estimated age ranges, gender inferences, or other projected or inferred attributes of the user, a user segmentation profile 124 for the user whose location history 120 has been captured can be generated. In terms of a user segmentation profile 124, an illustrative user profile breakdown can, for instance, be categorized as:

TABLE 1

Claritas Prizm ™ NE Seg 1, Age 5-12
Claritas Prizm ™ NE Seg 10, Age 12-18, Gender Female
Claritas Prizm ™ NE Seg 15, Age 25-30, Gender Male In one or more implementations, the process of capturing location history 120 reflecting places visited by mobile device 102 can be repeated to detect changes in the user's set of visited locations 132, including home and work locations.

In one or more implementations, the profiling algorithms or other location-based processing can be run on the mobile device 102 (client) side, on wireless server 110, or other servers or logic, depending for example on configuration settings including user-selectable privacy settings. In one or more implementations, the location, home-identification, and market segmentation processes described herein can be combined in one encapsulated server request, or can be transmitted in separate requests to separate databases, servers, or services.

In one or more implementations, the market segmentation developed for a user can be further refined to categorize the user in terms of other attributes, including age and/or gender. In implementation, an SIC or similar code can be determined for the user's set of all visited locations in location history 120. The SIC or similar code can be used as a parameter to identify the age group that is most likely to visit this categorized location. For example, if the SIC or other code identifies a high-dwell time visited location as an elementary school, most likely the user is a child or other young individual. There could be a small probability of this user being an adult, such as a teacher, and a smaller probability can be assigned to adult age ranges.

The mobile device 102, wireless server 110, and/or other logic can then determine, based on location history 120 including all visited locations and time spent, the most likely age group for this user. This age group or bracket can be marked as an estimated age group. The age group estimation can be repeated and refined over each weekly or other cycle. If the same age group is identified as in the previous period or cycle or predetermined number of periods or cycles, the age group can be marked as confirmed. Similarly, if an identified age group changes after it has been confirmed in previous cycles, that nominal age group can be marked as suspect or anomalous. The process of estimated age refinement can be repeated or updated. It may be noted that categorization or marking of age bracket determinations as suspect or confirmed in one regard can also be viewed to refer to the uncertainty or confidence level of the result. In one or more implementations, the age group assigned to a user can likewise be assigned a numerical confidence value, such as a value between 0 and 1 or others. In one or more implementations, a user segmentation profile 124 or other demographic profile or characterization can be expanded to include an inferred or confirmed gender, based on location history, time of day, usage pattern, or other information.

In one or more implementations of the present teachings, in terms of deployment of mobile device 102, optimizations can be provided to reduce the overall level of energy consumption in the mobile device 102 during location processing, and/or other times. An objective of energy-reduction techniques is to cause location processing to have a minimum impact on the standby battery life of the cellular phone or other mobile device 102 whose functionality has been extended to location-based processing, according to the present teachings. In one or more implementations in these regards, the sampling rate at which set of location fixes 130 are taken and other processing details can be adapted to optimize battery and CPU usage on the mobile device 102. For example, if a dwell time greater than three hours or other comparatively long amount of time is detected, the sampling rate can be reduced to conserve battery power of mobile device 102.

In one or more implementations in further regards, the operation of the mobile device 102 can also or instead, for instance, be changed from a continuous mode to a sequential mode. For example, instead of performing location fixes 24 hours a day for each day of the week, the day can be divided into predetermined slots, such as for example 8 slots of 3 hours each. Instead of performing location fixes over all hours or all slots, location fixes can be taken in one, two, or another number of slots, for each day. The selected slots can be for example between 00 hr to 03 hr and 09 hr to 12 hr, omitting other slots. In one or more implementations, a goal of preferentially performing location fixes within certain time slots is to attempt to discover a user's home and work locations first, using higher-likelihood periods for home and work visitation. Once home and work locations are processed and confirmed as described herein, other time slots can be sampled throughout each day or selected days. In one or more implementations in this regard, the user profiling application can be "awake" or active only for 3 to 6 hours a day instead of 24 hours, thereby reducing processing time and battery drain.

In one or more implementations, it is also possible to employ an adaptive location fix rate, rather than sample the position of mobile device 102 at strictly fixed intervals. In one or more implementations, instead of a fix every 3 minutes, for instance, if user is at a visited location (including home) for a comparatively long time, the fix interval can be gradually increased on the assumption that the user has not exhibited a tendency to relocate, and is more likely to remain at the current location for a period of time. In one or more implementations, the location fix interval can be scaled by the sum of consecutive dwell times. For example, if the user has been at the same location for 2 dwells (60 minutes if dwell time is 20 minutes), then the next location fix can be performed at an interval of 3 minutes*2=6 minutes, instead of a 3 minute interval. Other scalings or adjustments can be used.

In one or more implementations, the maximum for the fix interval can be capped at 30 minutes or another interval or period, to ensure the system continues to sample user position at a relatively low rate even when stationary, including to detect renewed movement. An adaptive location sample rate can be helpful in cases when the mobile device 102 is "parked" for a long duration, for instance while at the user's home, or work area.

Figure 5:
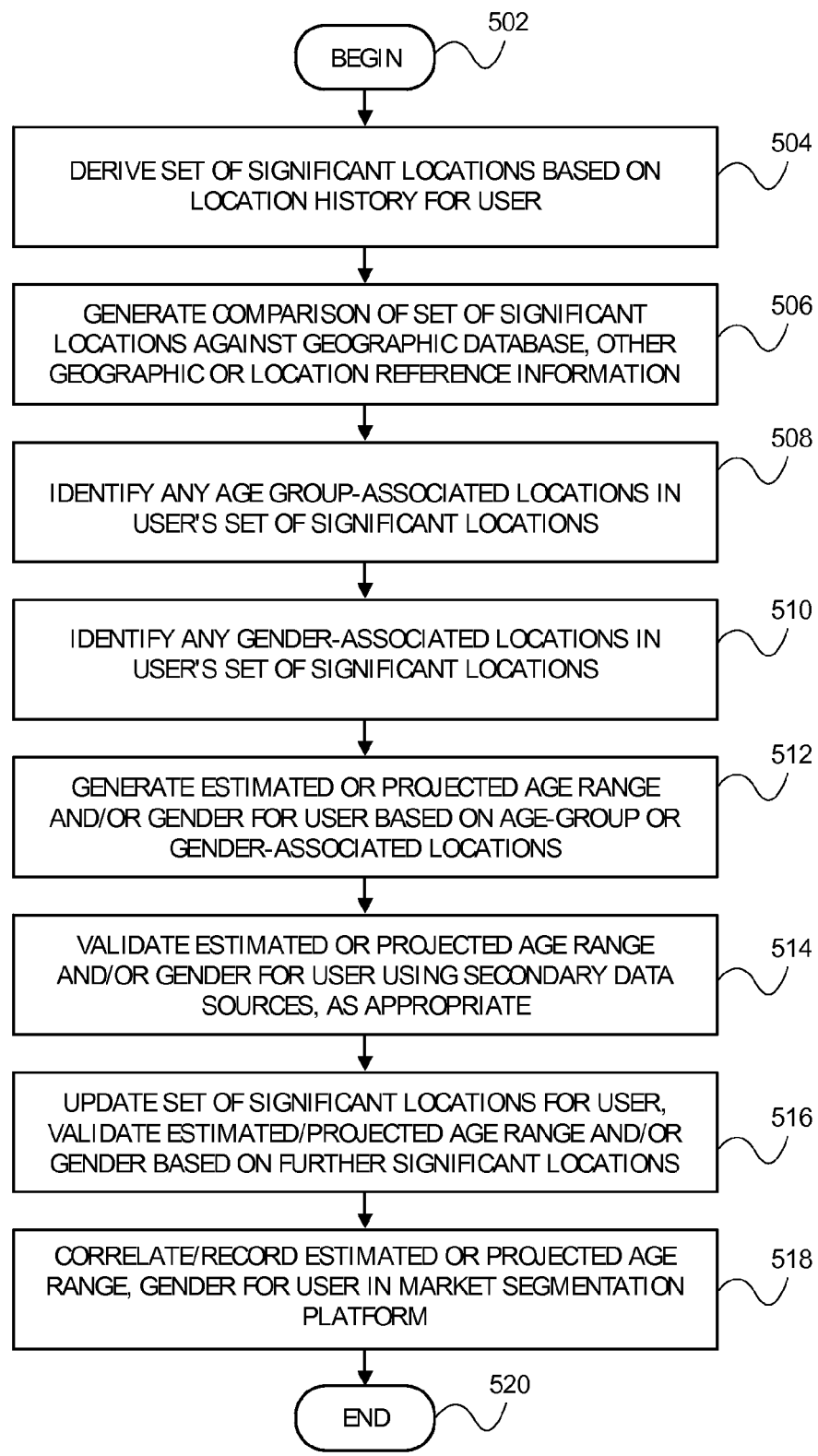
FIG. 5 illustrates a flowchart for determining age, gender, and other characteristics of a user profile based on location history, according to one aspect.

FIG. 5 illustrates a flowchart of processing that can be used to estimate or project certain characteristics of a user to record in or associate with a user segmentation profile 124, or otherwise. In 502, processing can begin. In 502, a set of significant locations 134 can be derived from the location history 120 for a user, using for example techniques described herein. In 504, set of significant locations 134 can be derived for a user based on the location history 120 for the user. In 506, wireless server 110 or other logic can generate a comparison of the set of significant locations 134 against a geographic database 126, such as the SIC database published by the U.S. government, or other reference information. In 508, any locations in set of significant locations 134 that may be associated with certain age groups or age ranges can be identified, based on comparison to geographic database 126 or other reference information. For example, a home location or other location with significant dwell-time that is located within the grounds of a college or university can lead to an estimated age range of 18 to 25, or other college or post-secondary school age range. For further example, a home location identified within an area zoned for a retirement community can lead to an estimate aged range of 60 to 70, or other retirement age ranges or brackets. It may be noted that other age ranges or values can be generated. In embodiments, it may for instance be noted that age ranges can consist of a single age value, for instance, if geographically-associated location data support specific years of age. In embodiments, broader age ranges, or brackets, for example, age ranges greater than 10 or more years, can also be generated. In embodiments, a confidence value for the estimated age range can also be generated. Other ranges and associations with locations or types of locations are possible.

In 510, any locations in set of significant locations 134 that may be associated with one gender or the other can be identified, based on comparison to geographic database 126 or other reference information. For example, a work location located within the site of a gender-specific institution, such as a women's-only college, may lead to a projection of a female gender for the subject user. For further example, a home location situated in a typically or frequently male environment, such as, for instance, a military installation, can lead to a projection of a male gender for the subject user. Other gender associations with locations or types of locations are possible. In one or more aspects, a confidence value for the projected user gender can also be generated. In 512, an estimate or projection for an age range and/or gender for the subject user can be generated and assigned, based on any age group-associated or gender-associated locations identified in the user's set of significant locations 124.

In 514, the estimated or projected age range and/or gender for the user can be validated using secondary data sources, as appropriate. For example, wireless server 110 or other logic can determine the accuracy of prior age group and/or gender identifications generated for other users of the network, for instance by checking those prior inferences against self-reported information, such as customer profile or billing records. For further example, any age group or gender affiliations that might be indicated in the user's transaction history conducted via mobile device 102 can also be consulted. In 516, the user's set of significant locations 134 can be updated, and the estimated or projected age group and/or gender for the user can be further verified or validated based on further significant locations identified in location history 120. In one or more aspects, if further significant locations do not correspond to the estimated or projected age group or gender, those inferences can be thrown out, and a new estimate or projection can be generated based on the larger location history 120 including the most recent set of significant locations 134.

In 518, the estimated or projected age group and/or gender for the user can be correlated with or recorded in market segmentation platform 128. For example, an independent estimate of the user's age range developed by market segmentation platform 128 can be compared to the estimated age range derived by wireless server 110 and/or mobile device 102 from location history 120, geographic database 126, and/or other reference information. In one or more aspects, rather than generate separate estimates or projections regarding the user's age group and/or gender, wireless server 110 and/or mobile device 102 can communicate information regarding set of significant locations 134 and other data to market segmentation platform 128 to initially generate those characteristics. In 520, processing can repeat, return to a prior processing point, jump to a further processing point, or end.

Figure 6:
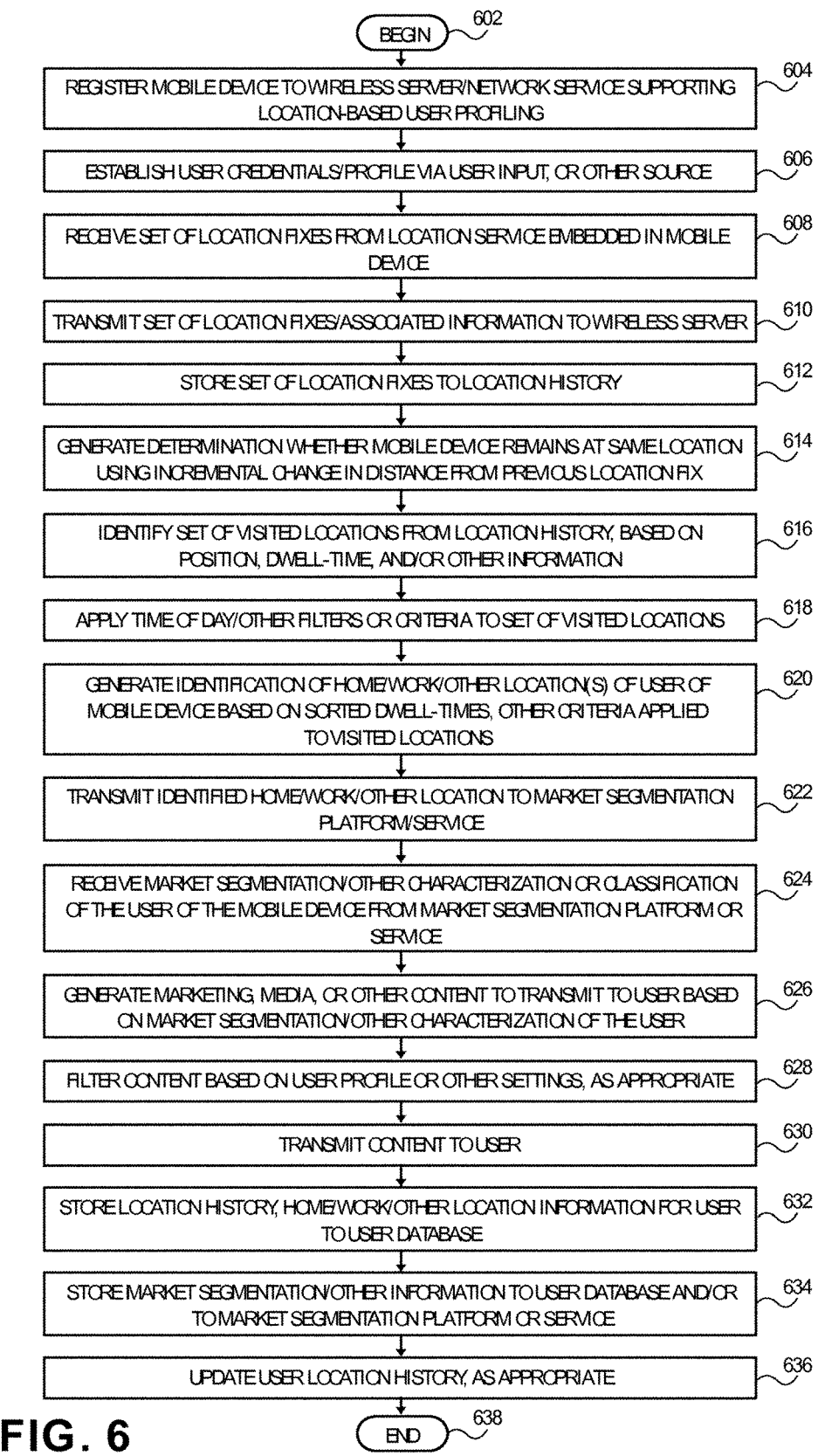
FIG. 6 illustrates a flowchart of overall location-based user profile processing, according to one or more implementations of the present teachings.

FIG. 6 illustrates a flowchart of overall positioning and user profiling processing, according to one or more implementations of the present teachings. In 602, processing can begin. In 604, a mobile device 102 such as a cellular telephone or other device can be registered to wireless server 110 and/or a carrier or service supporting location-based user profiling. In 606, user credentials and/or a user profile including for instance user configuration settings can be established. In one or more implementations, the user credentials and/or profile can be established, for example, via user input (such as a keypad on mobile device 102), or other sources. In 608, a set of location fixes 130 can be received from a location device and/or service embedded in mobile device 102, such as a GPS location service. In 610, the set of location fixes 130 and associated information can be transmitted to wireless server 110.

In 612, the set of location fixes 130 can be added or stored to the user's location history 120 in user database 112. In 614, wireless server 110 and/or mobile device 102 can generate a determination whether mobile device 102 remains at a same location or vicinity. The determination whether mobile device 102 remains at a same location or vicinity can be performed using an incremental position analysis measuring an incremental change in distance from a previous location fix, as described herein. In 616, a set of discrete visited locations can be identified from the user's location history 120, based upon parameters such as position of various locations at which a position fix has been reported, the dwell-times at locations, and/or other information. In 618, time of day or other filters or criteria can be applied to the user's set of visited locations 132 to refine that set of locations, for example, to separate locations reported during overnight hours as potential home locations, or to apply other rules.

In 620, wireless server 110 and/or mobile device 102 can generate an identification of a set of significant locations 134, including for example home, work, or other locations, of the user of mobile device 102. Home, work, or other sites in set of significant locations 134 can be generated, for instance, by sorting or filtering the set of visited locations 132 by dwell-time values, or other criteria. For example, a visited location displaying a dwell-time of 80 hours a week or more can be identified as a home location, whereas a visited location displaying a dwell-time of 35 to 55 hours a week can be identified as a work location. Other ranges of dwell-times, and other categories of locations, can be used.

In 622, the set of significant locations 134 can be transmitted to a market segmentation platform 128, or other marketing, demographic, or analytic platform or service. In 624, wireless server 110 and/or mobile device 102 can receive a market segmentation or other characterization or classification of the user of mobile device 102 from market segmentation platform 128 or other platform or service. In 626, content server 116 or other service or source can generate marketing, media, or other content to transmit to mobile device 102 based on the market segmentation and/or other characterization of the user of mobile device 102. For instance, marketing material identifying financial products including retirement investment options can be generated for local financial institutions to the home of a user located in a certain location and being of an age range consistent with potential retirement. In 628, the content generated according to the user's segmentation profile can be filtered or adapted based on the user's profile or other configuration settings, as appropriate. A user may wish for example to opt in or to opt out of different categories of marketing material or other content.

In 630, the targeted content tailored to the user's geographic and/or market segmentation profile can be transmitted to mobile device 102 and the user. In 632, the location history 120, set of significant locations 134 including, for instance, home, work, or other locations, as well as other location-based or other information can be transmitted to user database 112. In 634, the market segmentation and/or other information generated for the user of mobile device 102 can be transmitted and stored to user database 112 and/or market segmentation platform 128. In 636, the user's location history 120 can be updated based on further usage of mobile device 102 and/or other inputs, as appropriate. In 638, processing can repeat, return to a prior processing point, jump to a further processing point, or end.

Figure 7:
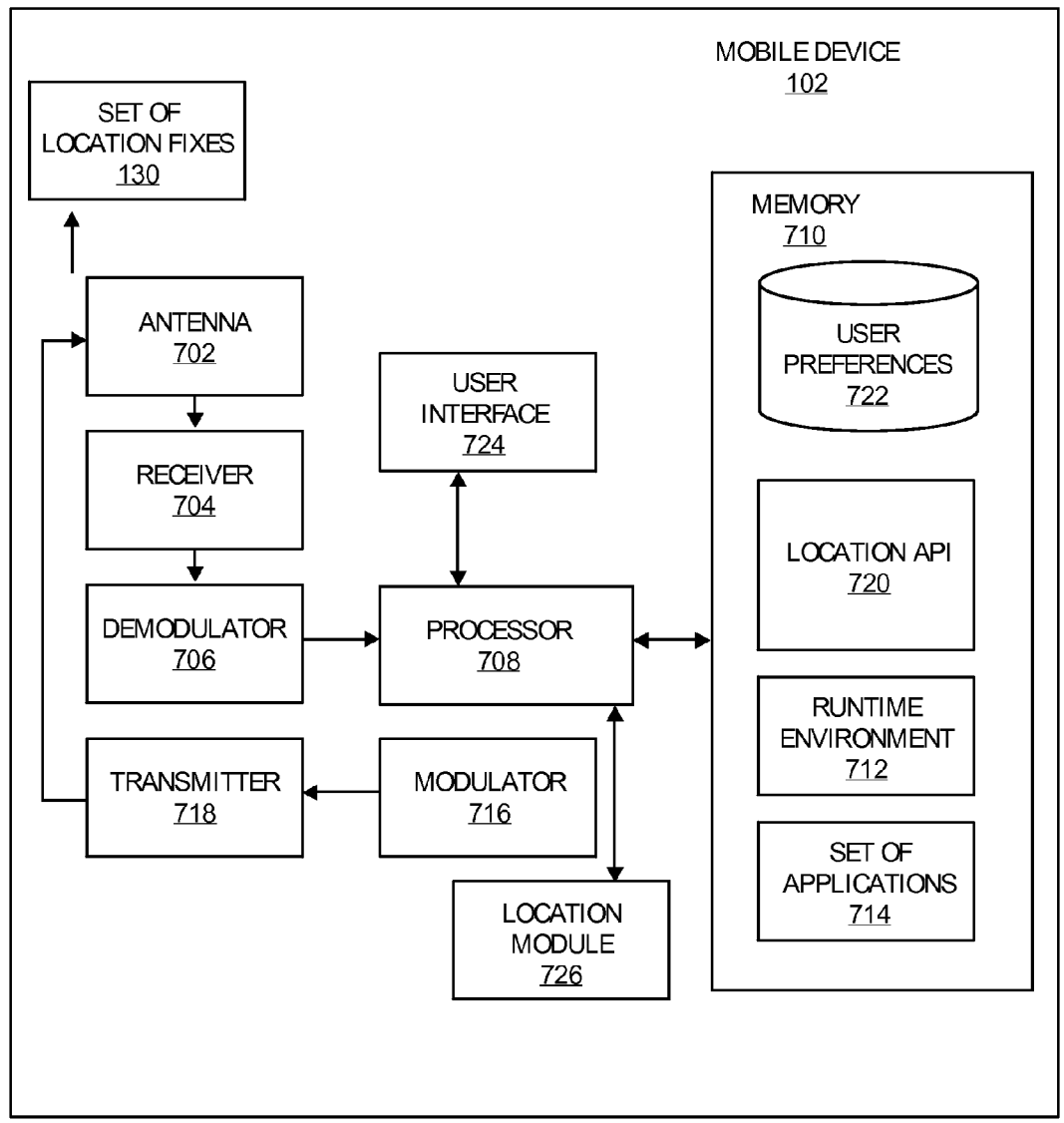
FIG. 7 illustrates an exemplary set of hardware and other resources in a mobile device, according to one or more implementations of the present teachings.

FIG. 7 illustrates an exemplary configuration of hardware, software, and other resources of a mobile device 102, consistent with implementations of the present teachings. Mobile device 102 can include at least one antenna 702 (e.g., a transmission receiver or group of such receivers comprising an input interface, etc.) that receives a signal (e.g., pertaining to a mobile call initiation or other handshake, a handshake response, a mobile application data transfer, a data event, data event response, handshake termination, and so on) and a receiver 704, which performs actions (e.g., filters, amplifies, down-converts, etc.) on the received signal. Antenna 702 can be further coupled to a transmitter 718 to transmit signals. Antenna 702 can for example transmit or receive a response to a handshake request, data event request, or the like. Transmitted signals can be or include a set of location fixes 130, and other data, as described herein. Antenna 702 and receiver 704 can also be coupled with a demodulator 706 that can demodulate received signals and provide the demodulated information to a processor 708 for processing. Mobile device 102 can additionally include memory 710 that is coupled to processor 708 and that can store data to be transmitted, received, and the like.

Processor 708 can analyze information received by antenna 702 and/or a user interface 724 of the mobile device 102 and/or generate information for transmission by a transmitter 718 via a modulator 716. Additionally, processor 708 can control and/or access one or more resources or components (e.g., 706, 712, 714, 716, 718) of the mobile device 102. Processor 708 can execute a runtime environment 712, such as BREW® available from Qualcomm Incorporated, as well as one or more set of applications 714 or other software, modules, applications, logic, code, or the like. Processor 708 can communicate with a location module 726, such as a Global Positioning System (GPS) module or chip, to receive and process location-related information, including set of location fixes 130. Processor 708 can further communicate with a location API (Application Programming Interface) 720 to execute function calls to extract location information, according to the present teachings. Processor 708 can likewise couple with user interface 724, such as a graphical user interface or other graphical display, to display graphics, video, call-related data including called set of location fixes 130, location history 120, and other information.

Figure 8:
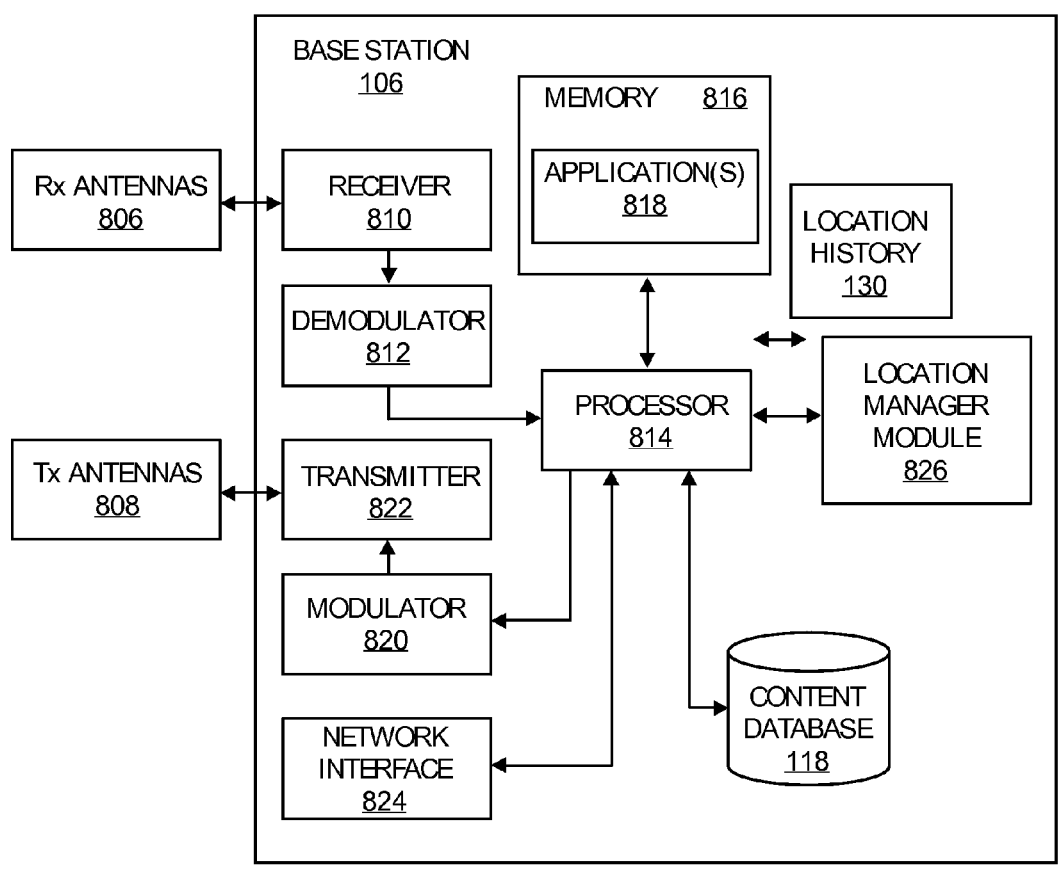
FIG. 8 illustrates an exemplary set of hardware, software, and other resources in a base station and associated components, according to one or more implementations of the present teachings.

FIG. 8 illustrates an exemplary set of hardware, software, and other resources that can be incorporated in, maintained by, or associated with base station 106, and associated network components, according to various implementations. Base station 106 can include, access, or communicate with a receiver 810 that receives signal(s) from one or more mobile device 102 through a plurality of receive antennas 806, and a transmitter 822 that transmits to the one or more mobile device 102 through a transmit antenna 808. Receiver 810 can receive information from receive antennas 806 and be operatively coupled with a demodulator 812 that demodulates received information. A processor 814 can analyze demodulated signals provided by demodulator 812. The processor 814 further couples to a memory 816 that can store one or more application 818 that can execute, support, facilitate and/or participate in communication activities as described herein. Processor 814 can likewise couple with a location manager module 826 to capture, manage, store, and transmit location history 120 and other information, as described herein. Processor 814 can in addition communicate with a network interface 822, such as an Ethernet or other wired, optical, or wireless interface, to communicate with other network links or resources, such as air interface 104. In one or more implementations, processor 814 and associated resources can be hosted in wireless server 110. In one or more implementations, wireless server 110 and associated resources can be hosted in base station 106. In one or more implementations, wireless server 110 and associated resources can be located separately or remotely from base station 106. In one or more implementations, multiple or distributed processors can be used.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

For further example, while implementations have been described in which a location history 120 is generated by tracking the location fixes for one mobile device 102 of a user, in one or more implementations location fixes for multiple devices used by one user can be combined to generate an aggregate location history. For again further example, while aspects have been described in which location processing and other logic used to generate market segmentation or other information for a user of mobile device 102 is performed in a single wireless server 110, In one or more implementations, the processing of the user's location history 120 and other information can be hosted in one or more other servers, such as a profiling server or others. Other resources described as singular or integrated can in one or more implementations be plural or distributed, and resources described as multiple or distributed can In one or more implementations be combined. The scope of the present teachings is accordingly intended to be limited only by the following claims.

What is claimed is:

1. A method of generating a user profile based on location fixes, comprising:
receiving, at a communications device, a set of location fixes representing one or more locations of a mobile device;
combining, by the communications device, the set of location fixes to generate a user location history for a user of the mobile device;
identifying, by the communications device, a set of visited locations in the user location history;
sorting, by the communications device, the set of visited locations by at least dwell-time of the mobile device at each of the set of visited locations to identify a set of significant locations to the user of the mobile device; and
generating, by the communications device, a user profile for the user of the mobile device based at least on the set of significant locations.

2. The method of claim 1, wherein the set of location fixes comprises at least one of a set Global Positioning System (GPS) location fixes, a set of Assisted Global Positioning System (A-GPS) fixes, a set of Galileo system fixes, or a set of tower triangulation fixes.

3. The method of claim 1, wherein the mobile device comprises at least one of a cellular telephone, a Global Positioning System (GPS) device, a network-enabled personal digital assistant device, or a network-enabled media player device.

4. The method of claim 1, wherein the set of location fixes comprises a set of at least longitude and latitude readings.

5. The method of claim 1, wherein the set of location fixes is generated at predetermined fixed intervals.

6. The method of claim 1, wherein the set of location fixes is generated at dynamically adjusted intervals as a function of incremental changes in user location.

7. The method of claim 1, wherein the identifying the set of visited locations comprises computing a dwell-time based on a change in user location that is less than a threshold for identifying a stationary status.

8. The method of claim 1, wherein the sorting the set of visited locations comprises identifying at least two visited locations having a greatest dwell-time over a predetermined observation period.

9. The method of claim 8, wherein the identifying at least a top two visited locations comprises identifying at least one of a home location or a work location.

10. The method of claim 9, wherein the identifying at least one of the home location or the work location comprises comparing the at least top two visited locations to a geographic database.

11. The method of claim 1, further comprising comparing the user location history to a market segmentation database to generate a user segmentation profile.

12. The method of claim 11, wherein the user segmentation profile comprises at least one of a user age range, a user marketing rating, or a projected user gender.

13. The method of claim 11, further comprising outputting the user segmentation profile to at least one of a marketing delivery platform or a media delivery platform.

14. The method of claim 13, further comprising transmitting at least one of marketing content or media content to the mobile device based on the user segmentation profile.

15. The method of claim 1, further comprising controlling a frequency of location fix processing to control a rate of power consumption by the mobile device.

16. A system for generating a user profile based on location fixes, comprising:
a wireless interface to a mobile device; and
a server, communicating with the wireless interface, the server configured to:
receive a set of location fixes representing one or more locations of the mobile device, combine the set of location fixes to generate a user location history for a user of the mobile device, identify a set of visited locations in the user location history, sort the set of visited locations by at least dwell-time of the mobile device at each of the set of visited locations to identify a set of significant locations to the user of the mobile device, and generate a user profile for the user of the mobile device based at least on the set of significant locations.

17. The system of claim 16, wherein the mobile device comprises at least one of a cellular telephone, a Global Positioning System (GPS) device, a network-enabled personal digital assistant device, or a network-enabled media player device.

18. The system of claim 16, wherein the server being configured to sort the set of visited locations comprises the server being configured to identify at least one of a home location and a work location based on at least a top two visited locations having a greatest dwell-time over a predetermined observation period.

19. The system of claim 16, wherein the server is further configured to compare the user location history to a market segmentation database to generate a user segmentation profile, wherein the user segmentation profile comprises at least one of a user age range, a user marketing rating, or a projected user gender.

20. The system of claim 16, wherein a frequency of location fix processing is controlled to control a rate of power consumption by the mobile device.

21. A system for generating a user profile based on location fixes, comprising:

means for providing a wireless interface to a mobile device; and means for serving data to the mobile device and for communicating with the means for providing the wireless interface, the means for serving data to the mobile device comprising:

means for receiving a set of location fixes representing one or more locations of the mobile device, means for combining the set of location fixes to generate a user location history for a user of the mobile device, means for identifying a set of visited locations in the user location history, means for sorting the set of visited locations by at least dwell-time of the mobile device at each of the set of visited locations to identify a set of significant locations to the user of the mobile device, and means for generating a user profile for the user of the mobile device based at least on the set of significant locations.

22. The system of claim 21, wherein the mobile device comprises at least one of a cellular telephone, a Global Positioning System (GPS) device, a network-enabled personal digital assistant device, or a network-enabled media player device.

23. The system of claim 21, wherein the means for sorting the set of visited locations comprises means for identifying at least one of a home location or a work location based on at least a top two visited locations having a greatest dwell-time over a predetermined observation period.

24. The system of claim 21, wherein the means for serving data further comprises means for comparing the user location history to a market segmentation database to generate a user segmentation profile, wherein the user segmentation profile comprises at least one of a user age range, a user marketing rating, or a projected user gender.

25. The system of claim 21, wherein a frequency of location fix processing is controlled to control a rate of power consumption by the mobile device.

26. A non-transitory computer-readable medium comprising:

at least one instruction for causing a computer to receive a set of location fixes representing one or more locations of a mobile device;

at least one instruction for causing the computer to combine the set of location fixes to generate a user location history for a user of the mobile device;

at least one instruction for causing the computer to identify a set of visited locations in the user location history;

at least one instruction for causing the computer to sort the set of visited locations by at least dwell-time of the mobile device at each of the set of visited locations to identify a set of significant locations to the user of the mobile device; and at least one instruction for causing the computer to generate a user profile for the user of the mobile device based at least on the set of significant locations.

27. The non-transitory computer-readable medium of claim 26, wherein the mobile device comprises at least one of a cellular telephone, a Global Positioning System (GPS) device, a network-enabled personal digital assistant device, or a network-enabled media player device.

28. The non-transitory computer-readable medium of claim 26, wherein the at least one instruction for causing the computer to sort the set of visited locations comprises at least one instruction for causing the computer to identify at least one of a home location or a work location based on at least a top two visited locations having a greatest dwell-time over a predetermined observation period.

29. The non-transitory computer-readable medium of claim 28, further comprising at least one instruction for causing the computer to compare the user location history to a market segmentation database to generate a user segmentation profile, wherein the user segmentation profile comprises at least one of a user age range, a user marketing rating, or a projected user gender.

30. The non-transitory computer-readable medium of claim 28, wherein the non-transitory computer-readable medium further comprises at least one instruction for causing the computer to control a frequency of location fix processing to control a rate of power consumption by the mobile device.

31. A method of generating a user profile based on location fixes, comprising:

capturing, at a mobile device, a set of location fixes representing one or more locations of the mobile device; and communicating, by the mobile device, the set of location fixes to a processor, the processor being configured to:

receive the set of location fixes from the mobile device, combine the set of location fixes to generate a user location history for a user of the mobile device, identify a set of visited locations in the user location history, sort the set of visited locations by at least dwell-time of the mobile device at each of the set of visited locations to identify a set of significant locations to the user of the mobile device, and generate a user profile for the user of the mobile device based at least on the set of significant locations.

32. The method of claim 31, wherein the processor is located in the mobile device, and the mobile device comprises at least one of a cellular telephone, a Global Positioning System (GPS) device, a network-enabled personal digital assistant device, or a network-enabled media player device.

33. The method of claim 31, wherein the processor being configured to sort the set of visited locations comprises the processor being configured to identify at least one of a home location or a work location based on at least a top two visited locations having a greatest dwell-time over a predetermined observation period.

34. The method of claim 31, wherein the processor is further configured to compare the user location history to a market segmentation database to generate a user segmentation profile, wherein the user segmentation profile comprises at least one of a user age range, a user marketing rating, or a projected user gender.

35. The method of claim 31, wherein a frequency of location fix processing is controlled to control a rate of power consumption by the mobile device.

36. A mobile device, comprising:
a wireless interface to a server; and
a processor, communicating with the wireless interface, the processor configured to:
receive a set of location fixes representing one or more locations of the mobile device,
combine the set of location fixes to generate a user location history for a user of the mobile device,
identify a set of visited locations in the user location history,
sort the set of visited locations by at least dwell-time of the mobile device at each of the set of visited locations to identify a set of significant locations to the user of the mobile device, and
generate a user profile for the user of the mobile device based at least on the set of significant locations.

37. The mobile device of claim 36, wherein the processor is a component of the mobile device, and the mobile device comprises at least one of a cellular telephone, a Global Positioning System (GPS) device, a network-enabled personal digital assistant device, or a network-enabled media player device.

38. The mobile device of claim 36, wherein the processor being configured to sort the set of visited locations comprises the processor being configured to identify at least one of a home location or a work location based on at least a top two visited locations having a greatest dwell-time over a predetermined observation period.

39. The mobile device of claim 36, wherein the processor is further configured to compare the user location history to a market segmentation database to generate a user segmentation profile, wherein the user segmentation profile comprises at least one of a user age range, a user marketing rating, or a projected user gender.

40. The mobile device of claim 36, wherein the processor is further configured to control a frequency of location fix processing to control a rate of power consumption by the mobile device.

41. The mobile device of claim 40, wherein the the processor being configured to control the frequency of location fix processing comprises the processor being configured to reduce the frequency of location fix processing when a stationary status of the mobile device has been detected for a predetermined threshold of time.

42. The mobile device of claim 36, wherein the processor is further configured to adapt reception of the set of location fixes to a sequential mode based on a predetermined set of time slots associated with the set of visited locations.

43. A mobile device, comprising:
means for providing a wireless interface to a server; and
means for processing data, communicating with the means for providing the wireless interface, the means for processing data comprising:
means for receiving a set of location fixes from the mobile device representing one or more locations of a mobile device,
means for combining the set of location fixes to generate a user location history for a user of the mobile device,
means for identifying a set of visited locations in the user location history,
means for sorting the set of visited locations by at least dwell-time of the mobile device at each of the set of visited locations to identify a set of significant locations to the user of the mobile device; and
means for generating a user profile for the user of the mobile device based at least on the set of significant locations.

44. The mobile device of claim 43, wherein the mobile device comprises the means for processing data, and the mobile device comprises at least one of a cellular telephone, a Global Positioning System (GPS) device, a network-enabled personal digital assistant device, or a network-enabled media player device.

45. The mobile device of claim 43, wherein the means for sorting the set of visited locations comprises means for identifying at least one of a home location or a work location based on at least a top two visited locations having a greatest dwell-time over a predetermined observation period.

46. The mobile device of claim 43, wherein the means for processing data further comprises means for comparing the user location history to a market segmentation database to generate a user segmentation profile, wherein the user segmentation profile comprises at least one of a user age range, a user marketing rating, or a projected user gender.

47. The mobile device of claim 43, wherein the means for processing further comprises means for controlling a frequency of location fix processing to control a rate of power consumption by the mobile device.

48. A non-transitory computer-readable medium, comprising:
at least one instruction for causing a computer to receive a set of location fixes representing one or more positions of the mobile device;
at least one instruction for causing the computer to combine the set of location fixes to generate a user location history for a user of the mobile device;
at least one instruction for causing the computer to identify a set of visited locations in the user location history;
at least one instruction for causing the computer to sort the set of visited locations by at least dwell-time of the mobile device at each of the set of visited locations to identify a set of significant locations to the user of the mobile device; and
at least one instruction for causing the computer to generate a user profile for the user of the mobile device based at least on the set of significant locations.

49. The non-transitory computer-readable medium of claim 48, wherein the mobile device comprises at least one of a cellular telephone, a Global Positioning System (GPS) device, a network-enabled personal digital assistant device, or a network-enabled media player device.

50. The non-transitory computer-readable medium of claim 48, wherein the at least one instruction for causing the computer to sort the set of visited locations comprises at least one instruction for causing the computer to identify at least one of a home location or a work location based on at least a top two visited locations having a greatest dwell-time over a predetermined observation period.

51. The non-transitory computer-readable medium of claim 48, further comprising at least one instruction for causing the computer to compare the user location history to a market segmentation database to generate a user segmentation profile, wherein the user segmentation profile comprises at least one of a user age range, a user marketing rating, or a projected user gender.

52. The non-transitory computer-readable medium of claim 51, wherein the user segmentation profile comprises the at least one of the user age range, and the at least one instruction for causing the computer to compare the user location history to the market segmentation database to generate the user segmentation profile comprises at least one instruction for causing the computer to compare the user location history to a geographic database containing a set of age-associated locations to generate the user age range.

53. The non-transitory computer-readable medium of claim 51, wherein the user segmentation profile comprises at least the projected user gender, and the at least one instruction for causing the computer to compare the user location history to the market segmentation database to generate the user segmentation profile comprises at least one instruction for causing the computer to compare the user location history to a geographic database containing a set of gender-associated locations to generate the projected user gender.

54. The non-transitory computer-readable medium of claim 48, wherein the non-transitory computer-readable medium further comprises at least one instruction for causing the computer to control a frequency of location fix processing to control a rate of power consumption by the mobile device.

55. The non-transitory computer-readable medium of claim 54, wherein the at least one instruction for causing the computer to control the frequency of location fix processing comprises at least one instruction for causing the computer to reduce the frequency of location fix processing when a stationary status of the mobile device has been detected for a predetermined threshold of time.

56. The non-transitory computer-readable medium of claim 48, wherein the non-transitory computer-readable medium further comprises at least one instruction for causing the computer to adapt reception of the set of location fixes to a sequential mode based on a predetermined set of time slots associated with the set of visited locations.

57. A user segmentation profile stored on a non-transitory computer-readable medium, the user segmentation profile being generated by a method comprising:
receiving a set of user location fixes representing one or more locations of a mobile device;
combining the set of user location fixes to generate a user location history for a user of the mobile device;
identifying a set of visited locations in the user location history;
sorting the set of visited locations by at least dwell-time of the mobile device at each of the set of visited locations to identify a set of significant locations to the user of the mobile device; and
generating a user profile for the user of the mobile device based at least on the set of significant locations.

58. The method of claim 1, wherein the communications device corresponds to the mobile device or a server that is remote from the mobile device.

* * * * *